Nov. 14, 1944.   H. GAMACHE   2,362,896
VEGETABLE PEELER
Filed Jan. 13, 1944
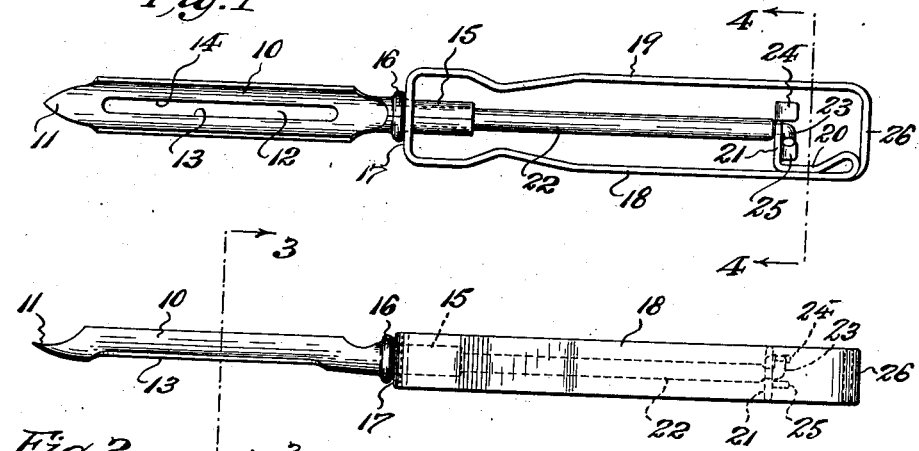
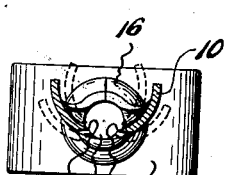
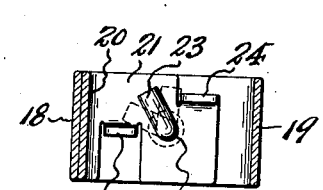
INVENTOR.
Homer Gamache,
BY George D. Richards
ATTORNEY.

Patented Nov. 14, 1944

2,362,896

UNITED STATES PATENT OFFICE 2,362,896

VEGETABLE PEELER

Homer Gamache, Newark, N. J., assignor of one-half to James V. Finaldi, Newark, N. J.

Application January 13, 1944, Serial No. 518,077

2 Claims. (Cl. 30—279)

This invention relates to a device for peeling vegetables, fruits or the like; and the invention has reference, more particularly, to a peeling device having a double edged blade supported by a handle in axial extension therefrom, so as to be capable of oscillatory rocking movement about the longitudinal axis of the handle, whereby, in use, a cutting edge of the blade will be caused to readily follow irregular contours of the vegetable or the like operated upon, so as to produce a paring or peel of substantially uniform thickness, and consequently with but minimum waste of the usable material of the vegetable or the like.

The invention has for an object to provide a peeling device of exceedingly simple construction, requiring but a minimum number of parts, and a minimum amount of material, whereby the same can be easily produced at low material and labor costs, while, nevertheless, providing a strong, durable and easily cleaned instrument for the intended purpose.

The invention has for another object to provide a peeling device of the kind above referred to which comprises a handle member formed from a single length of strip metal stock in such manner as to include, intermediate its forward and rear ends, and within its interior, a transverse bearing portion; the latter being aligned with a bearing opening with which the forward end of handle member is provided, whereby to oscillatably mount a blade journal extension; said internal transverse bearing portion being formed with suitably positioned and relatively spaced stop lugs with which an oscillatable angularly bent stop arm, with which the rear end of the blade journal extension is provided, cooperates, so as to limit the oscillatory rocking movement of the peeler blade relative to and about the longitudinal axis of the handle.

Other objects of this invention, not at this time more particularly enumerated, will be understood from the following detailed description of the same.

An illustrative embodiment of this invention is shown in the accompanying drawing, in which:

Fig. 1 is a plan view of the peeling device according to this invention; Fig. 2 is a side elevational view thereof; Fig. 3 is a transverse sectional view, taken on line 3—3 in Fig. 2, but drawn on an enlarged scale; and Fig. 4 is another transverse sectional view, taken on line 4—4 in Fig. 1, and also drawn on an enlarged scale.

Similar characters of reference are employed in the above described views to indicate corresponding parts.

Referring to the drawing, the reference character 10 indicates a blade or cutter member which is made of sheet metal, stamped therefrom to form an elongated body of concavo-convex cross-sectional shape. The blade body 10 terminates at its forward free end in a suitably shaped and pointed extremity 11, adapted for use as a gauge or corer for removing undesired parts from a vegetable or other body to be peeled. Said blade body 10 is provided with a longitudinally extending, centrally disposed slot 12, the side margins of which define oppositely directed and suitably sharpened cutting edges 13 and 14. Said cutting edges are spaced apart and oppositely directed, being thus so related that the one not in use cooperates with the one in use as a guide or guard adapted to limit the cutting peneration or depth of cut made by the latter. At its rearward end, the material of the blade body is wrought into a substantially axially disposed rearwardly extending tubular journal member 15. Formed in the forward portion of said tubular journal member 15 is an annular enlargement or bead 16 which abuts the forward end of the handle member, when the blade body is assembled therewith, so as to prevent rearward displacement of the blade body relative to said handle member.

The handle member of the peeling device comprises a strip of metallic stock doubled endwise upon itself so as to form a transverse front end bearing portion 17 and a pair of laterally spaced apart side portions 18 and 19 which extend rearwardly from said front bearing portion 17. The side portion 18 is of greater length than is the side portion 19. The free end part of said side portion 18 is inwardly doubled back upon itself to provide a bracket section 20 extending forwardly along the inner face of the main part of said side portion 18; and the free end part of said bracket section 20 is turned to extend angularly thereto and transversely across the space intermediate the side portions 18 and 19, to thus provide a transverse internal bearing portion 21 disposed in rearwardly spaced parallel relation to the front end bearing portion 17 of the handle member.

Said front end bearing portion 17 of the handle member is provided with a centrally disposed bearing opening through which the tubular journal member 15 of the blade body extends into the interior of the handle member until stopped by the abutment of the bead 16 upon the outer face of said front end bearing portion.

Said internal bearing portion 21 is likewise provided with a centrally disposed bearing opening, to receive and journal the rear end of a blade journal extension rod 22. Said journal extension rod 22 is of diametric size to enter its forward end in the tubular journal member 15 of the blade body, to which it is suitably affixed so as to turn therewith. The rearward end portion of said journal extension rod 22 is provided with an angularly bent stop arm 23 disposed to laterally project therefrom, adjacent to the internal bearing portion 21.

The internal bearing portion 21 is provided with a stop lug 24 struck out from the body thereof and turned to angularly project therefrom at a point adjacent to the journal extension rod 22, and offset relative to one side thereof so as to lie in the path of movement of the stop arm 23, whereby to limit swinging movement of the latter in one direction. Said internal bearing portion 21 is further provided with a second stop lug 25 also struck out from the body thereof and turned to angularly project therefrom at a point adjacent to the journal extension rod 22 and offset relative to one side thereof so as to lie in the path of movement of the stop arm 23, whereby to limit swinging movement of the latter in the opposite direction. Said stop arm 23 is disposed to lie adjacent to the rearward face of said internal bearing portion 21, whereby to prevent forward displacement of the blade body relative to the handle member.

The rearward end section of the handle member side portion 19 is bent angularly inward to form a handle rear end portion 26 extending transversely from said side portion 19 to the side portion 18, being suitably secured to the latter by brazing, welding or otherwise fastening the same thereto.

The side portions 18 and 19 of the handle member may be suitably shaped, and together with the front and rear end portions, are adapted to provide a hollow but rigid handle, within the interior of which is located the above described means for limiting oscillatory movements of the blade member which is operatively supported for extension from said handle.

It will be understood that, in the use of the device, when peeling a vegetable or the like therewith, the pivotal oscillation of the blade or cutter body about its longitudinal axis will allow the applied cutting edge thereof to follow the contour of the vegetable or other body, so as to pare therefrom a peel without undue waste; while at the same time the peel or paring will clear itself through the slot 12 which borders the operative cutting edge. The marginal portions of the non-operative or opposed cutting edge portion will, by engagement with the surface of the vegetable or other body, serve as a gauge or guard whereby to limit the cutting penetration or depth of cut made by the operative cutting edge, whereby to limit the thickness of the peel or paring so as to prevent waste of the usable part of the vegetable or other body. The device may be moved in opposite directions, or may be applied and used by either the right or left hand of the operator, the cutting edges 13 and 14 being optionally usable.

Having now described my invention, I claim:

1. A vegetable peeler comprising a blade body having a journal means extending axially from its rear end, said journal means terminating in an angularly bent stop arm, a handle member comprising a strip of material doubled upon itself to provide a transverse front end bearing portion and laterally spaced longitudinal side portions extending rearwardly therefrom, an end part of one of said side portions being inwardly doubled back upon itself to provide a bracket extension, said bracket extension terminating in a transversely disposed internal bearing portion, said blade body journal means being journaled in and between said front end and internal bearing portions, and said internal bearing portion having stop lugs angularly extending therefrom respectively adjacent opposite sides of the axis of said blade body journal means and disposed in the path of movement of said stop arm, whereby to limit swinging movements of the latter and thus to limit oscillation of said blade body about its axis.

2. A vegetable peeler comprising a blade body having a journal means extending axially from its rear end, said journal means terminating in an angularly bent stop arm, a handle member comprising a strip of material doubled upon itself to provide a transverse front end bearing portion and laterally spaced longitudinal side portions extending rearwardly therefrom, an end part of one of said side portions being inwardly doubled back upon itself to provide a bracket extension, said bracket extension terminating in a transversely disposed internal bearing portion, said blade body journal means being journaled in and between said front end and internal bearing portions, said internal bearing portion having stop lugs angularly extending therefrom respectively adjacent opposite sides of the axis of said blade body journal means and disposed in the path of movement of said stop arm, whereby to limit swinging movements of the latter and thus to limit oscillation of said blade body about its axis, and an end part of the other side portion being transversely bent toward said first mentioned side portion and joined thereto to provide said handle member with a closed rear end.

HOMER GAMACHE.